Figure 3:
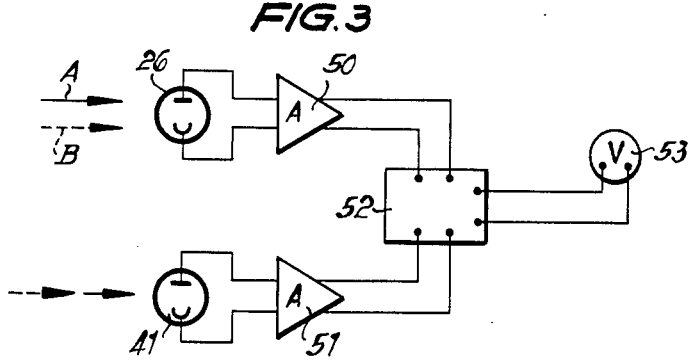

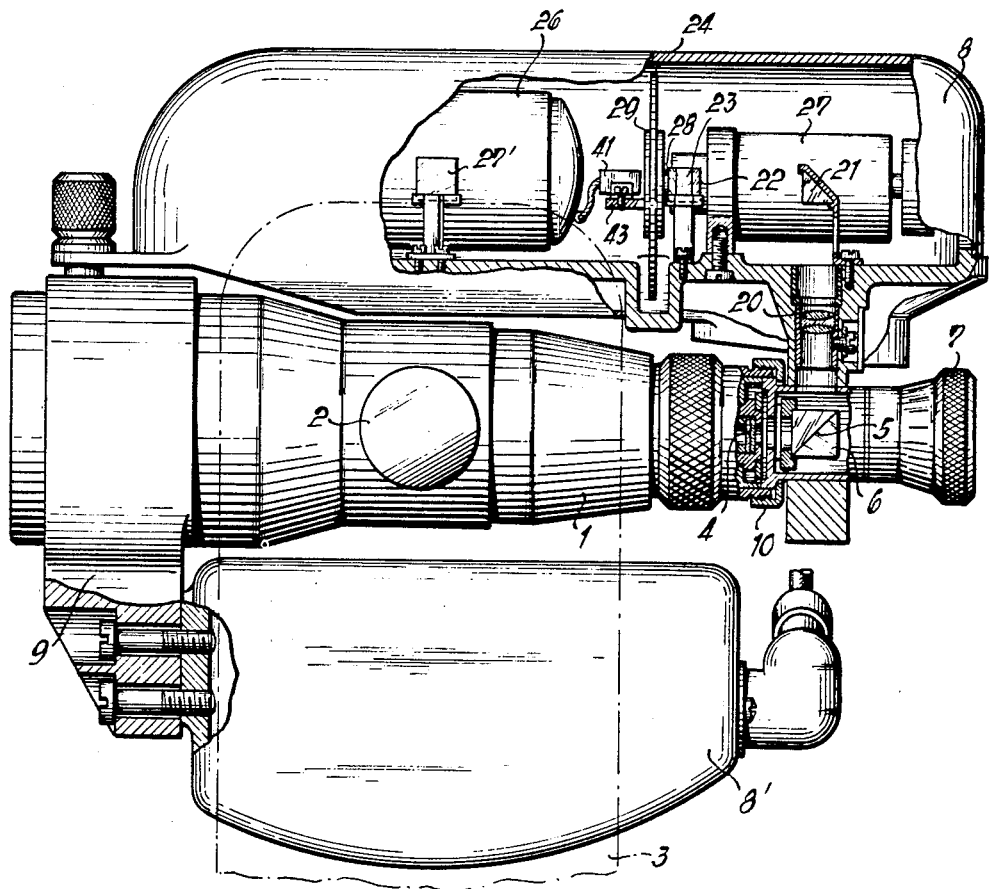

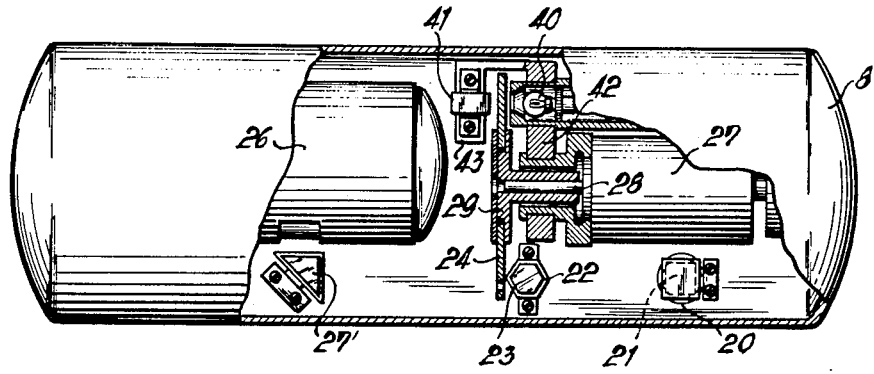
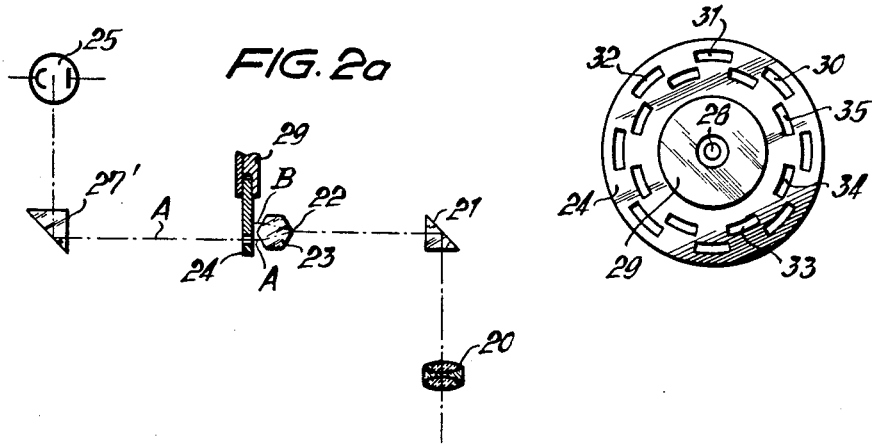
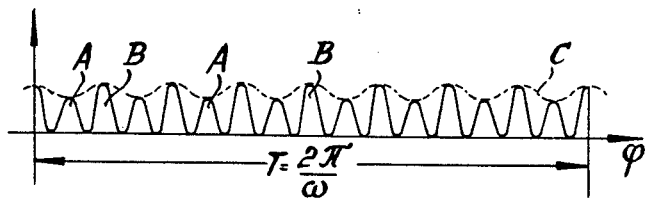

June 5, 1962 M. BIERMANN 3,038,082
PHOTOMETRIC DEVICE
Filed Aug. 18, 1960 3 Sheets-Sheet 3

INVENTOR
*Markus Biermann*

By: *Samuel W. Kipnis*
Atty.

United States Patent Office 3,038,082
Patented June 5, 1962

3,038,082
PHOTOMETRIC DEVICE
Markus Biermann, Berlin-Schlachtensee, Germany, assignor to Continental Elektroindustrie A.G., Askania-Werke, Berlin-Mariendorf, Germany
Filed Aug. 18, 1960, Ser. No. 50,399
Claims priority, application Germany Aug. 20, 1959
9 Claims. (Cl. 250—220)

The present invention concerns a photometric device for comparison of two rays or beams of light of the type comprising a light sensitive transducer, a shutter or control device for alternately and periodically conducting the two beams or rays of light to the light sensitive element, a source of alternating voltage for generating an auxiliary alternating voltage and means for comparing the amplitudes of the portions of the cycle of the measuring alternating voltage generated by the light sensitive element corresponding to the incidence of the two beams or rays of light, the electrical comparison of the two individual portions of the cycle being effected with the use of the auxiliary alternating voltage, which is synchronous with the operation of the beam switch or shutter.

Such devices are known. In stationary devices of this type which are powered from public utility systems, the latter generally serve as the source of auxiliary alternating voltage. In other devices energized, for instance, by a battery, motor controlled shutter devices are provided in which the rotor shaft of the motor is coupled with an inductive generator of auxiliary alternating voltage. Devices are also known that are provided with an inductively energized oscillating diaphragm shutter system receiving power from a source of alternating voltage, in which the source of alternating voltage serves both for driving the oscillating diaphragm device and as a source of auxiliary alternating voltage.

The auxiliary alternating voltage in these and similar devices must be exactly synchronous with the functioning of the shutter. This is true regardless of the manner of electrical comparison of the individual voltages associated with the beams or rays of light to be compared, which are present as portions of the measuring voltage produced by the light sensitive element of the device. In the oscillating diaphragm systems discussed above, exact synchronism is not assured, since such systems are generally driven in a condition of resonance so that phase displacement easily occurs as between the functioning of the oscillating diaphragm system and the alternating voltage energizing this system. In systems including a driving motor in connection with a generator of auxiliary voltage, this auxiliary voltage is generated essentially synchronously, but, particularly in portable devices, spatial considerations impose limitations on design and construction.

The present invention provides an improved photometric device of the above-indicated type for the comparison of two beams or rays of light comprising a light sensitive element, a shutter device for alternately and periodically conducting the two beams or rays of light to the light sensitive element, a source of alternating voltage for generating an auxiliary alternating voltage and means for electrically comparing the amplitudes of the individual voltages appearing as portions of the cycle of voltage produced by the light sensitive element and associated with the two beams or rays of light, in which device the electrical comparison of the individual voltages is effected with the cooperation of an auxiliary alternating voltage generated by a source in synchronism with the functioning of the switching device, the device of the present invention being characterized by the fact that the auxiliary alternating voltage is generated in a light-electrical generator from a beam or ray of light which is also periodically interrupted by the same switching or control device.

The invention can be used both with motor driven rotary chopper shutters and, with special advantages, with oscillating shutter devices, and may be carried out in a variety of different detailed manners. One may provide a special light sensitive element at the switching device and an auxiliary source of light in the vicinity of the switching device, so that the light sensitive element is exposed to a beam or ray of light from the source of auxiliary light which is thus periodically controlled by the switching device. It is also possible to use a light beam under measurement which is already periodically controlled by the switching device for generating the auxiliary alternating voltage; for instance, a ray dividing element is provided behind the switching device in the path of one of the periodically interrupted beams of light being measured, by means of which element a fraction of this beam or ray of light is conducted to a second light sensitive element for generating the auxiliary alternating voltage. It is also possible to eliminate entirely any special light sensitive element, so that the light sensitive element used for measuring purposes in the device is also used for generating the auxiliary alternating voltage. This can be done, for instance, by providing filters, selective amplifiers or other electronic devices, such as triggered multivibrators, to which the signal voltage available from the single light sensitive element is conducted, simultaneously and independently of the further path of the two measuring voltages to be compared with each other, to the electrical part of the comparing device, in which the auxiliary alternating voltage can be derived and used.

The appended drawings show embodiments of the invention.

Figure 4:
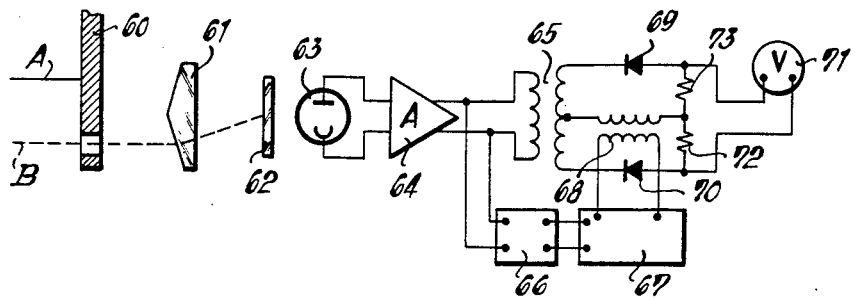
Figure 5:
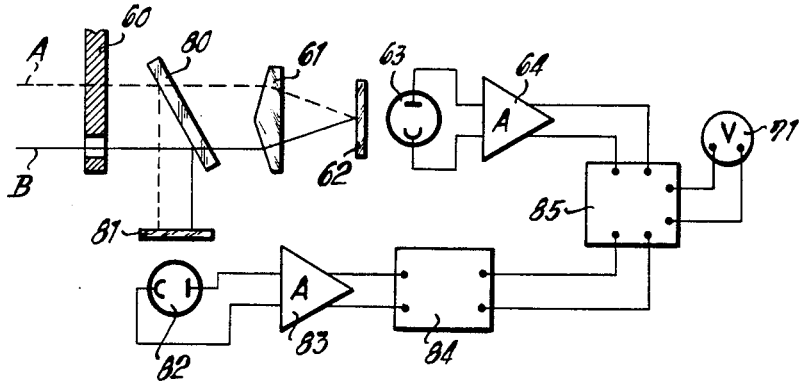

In the drawings:
FIGURE 1 is a side view of the telescope tube of a geodetic instrument for measuring angles which is provided with a photometric device for adjustment of its objective hairline to a luminous object under observation, partially broken away in vertical section;
FIGURE 2 is a horizontal sectional view of the light-electrical portion of the device shown in vertical section in FIGURE 1;
FIGURE 2a shows schematically the optical path of the image forming rays in the photometer of the device;
FIGURE 2b is a view in elevation of the switching device or shutter employed in this embodiment;
FIGURE 2c is an illustration of the waveform of the alternating voltage produced by the light sensitive element of the photometric device;
FIGURE 3 is a schematic electrical diagram of the device of FIGURE 2; and
FIGURES 4 and 5 show, by way of examples, other embodiments of the present invention of different construction.

In FIGURE 1 the reference numeral 1 indicates the telescope of a geodetic instrument for measuring angles which is rotatably journalled about its horizontal axis 2 in supporting uprights 3. The supporting uprights 3 are swingable around a vertical axis so that the hairline of the telescope 1 can be adjusted in both azimuth and elevation.

The objective of the telescope 1 forms an image of the luminous object to be measured on the reticle 4 of the telescope on which there is provided a fiber cross or other centering indicator. Behind the reticle 4 a half-reflecting mirror is provided on a diagonal surface 5 of a prismatic body 6 which conducts a certain fraction of the light radiation being received to the eyepiece 7 and another fraction of this radiation to the light-electrical device generally designated at 8. Thus, the object to be measured may be observed through the eyepiece 7. In coarse adjustment of the telescope target alignment, the telescope is visually aimed at the object to be measured with the help of the eyepiece 7 to bring the image into the field of view. In fine adjustment the light-electrical device 8 is used, being affixed to the telescope by a ring 9 disposed around the head of the telescope and a threaded connection 10 at the connecting tube of the eyepiece.

The image of the object to be measured which is focused in the plane of the reticle 4 is reproduced in the plane of the prism edge 22 of the prism 23 by means of the optical reproducing system 20 and a prism 21. The prism edge 22 subdivides the projected image into two partial images, and the light beams associated therewith are separated from each other and projected side by side into the rotating shutter 24 which serves as a switching device. This switching device alternately exposes the photocathode 25 of a photomultiplier tube 26 to one of the two beams which are indicated in FIGURE 2a by the reference letters A and B. In FIGURE 1 the reference numeral 27' indicates a reflecting prism which directs the path of the image forming rays of the two beams of light to the photocathode of the multiplier phototube.

The rotating shutter 24 is driven by a motor 27, which may be, for instance, a direct current motor and which carries the rotating shutter 24 in a holder 29 on its rotating shaft 28.

The construction of the rotating shutter 24 is shown in FIGURE 2b. At the outer margin of the disc 24 a series of slot shaped apertures 30, 31, 32 . . . are provided which serve to control beam A. Radially inward of this series, the disc 24 has slot shaped apertures 33, 34, 35 . . . which serve to control the beam B. All of these slots occupy identical angular portions, but the two sets are offset by this same angle. On rotation of the disc either beam A or beam B is given a free path to the photocathode 25, according to the arrangement of the slots, so that when the two beams of light A and B are unequal a periodic alternating voltage is generated at the photocathode and at the output terminals of the phototube, the output waveform being shown in FIGURE 2c for a complete rotation of the rotary shutter or diaphragm 24. When the beam A is weaker than the beam B, the smaller voltage amplitudes of FIGURE 2c correspond to the beam A and the greater voltage amplitudes correspond to the beam B, as illustrated.

A source of light 40 is provided near the rotating diaphragm 24 180° from the beam-splitting prism 23, at one side of the rotary shutter 24. A light sensitive element 41, for instance a photo diode, is disposed opposite the light source 40 and exposed to the beam of light generated by the light source 40. The beam from the light source 40 is interrupted periodically, by one of the series, for instance by the apertures 30, 31, 32 . . . of the rotating shutter 24, so that the light sensitive element 41 generates an alternating voltage which can be used as an auxiliary alternating voltage. The light source 40 is adjustably positioned with respect to the shaft 28 of the motor 27, for adjustment of the relative phase of the alternating voltage to be measured, shown in FIGURE 2c, and the auxiliary alternating voltage generated by the element 41. Adjustment is also provided by the mounting element 42 which holds the light source 40 and is rotatable, and in addition, by a frame 43 extending around the outer periphery of the rotating diaphragm 24 and holding the photo diode 41.

FIGURE 3 shows in highly schematic form the electrical parts of the device. The photomultiplier 26 is coupled to a frequency selective amplifier 50 which amplifies the harmonics of the fundamental frequency, which is indicated in dotted form in FIGURE 2c at C. The photosensitive element 41 is coupled to an amplifier 51 that amplifies the auxiliary alternating voltage. The outputs of amplifiers 50 and 51 are fed to a mixing device 52 in which the two amplified voltages are mixed by multiplication. The device 52 may contain, for instance, a Hall generator. The voltage output of the multiplying mixer is indicated in a measuring instrument 53. The momentary average value is always zero when the intensities of the two beams of light A and B are equal. This indicates that the image of the object to be measured falls exactly symmetrically on the prism edge 22 of the prism 23, so that the telescope tube 1 is aimed exactly at the object whose location is to be measured.

The container 8' attached to the telescope tube 1 receives certain electronic components of the described photometric device, the indicator instrument 53, the mixing device 52 and the amplifiers 50 and 51 being disposed in a special housing (not shown) and connected to the photometric device 8 by means of a cable.

FIGURE 4 shows another system according to the broader aspects of the invention in which the two light beams A and B are conducted to the matte disc 62 of a photo cathode 63 of a light sensitive element through a rotating shutter 62 and a beam-splitting prism 61. The amplified voltage to be measured is coupled from the terminals of an amplifier 64 to the primary coil of a transformer 65. This signal is also fed through a suitable amplifier 66 and used to control a multivibrator 67. The output of the multivibrator is coupled to the primary coil of a transformer 68. The two transformers 65 and 68 are components of a discriminator bridge circuit containing the two rectifier elements 69 and 70. By means of the measuring instrument the net voltage drop in the resistances 72 and 73 can be measured in the manner heretofore known. It will be observed that here again a signal produced by a light beam interrupted by the shutter is used to control the phase of the auxiliary voltage with which the signal is mixed.

In FIGURE 5, the device illustrated is of such construction that behind the shutter device, in the path of the image forming rays of the two beams of light A and B there is provided a partially transparent reflecting element 80, for instance a partially silvered or mirrored plane glass plate which diverts a portion of the beam from the light beams A and B and conducts these light currents or rays to the matte disc 81 of a light sensitive element 82. The auxiliary alternating voltage amplified in element 83 is filtered in the element 84 and conducted to a mixing device 85 as a sine-wave voltage in which it again (as disclosed hereinabove) is mixed with the voltage delivered by the amplifier 84, by multiplication. The momentary average of the mixer voltage is indicated in the instrument 71; it is proportional to the difference between the beam intensities and disappears when the two light beams are equal.

The use of the invention disclosed herein is obviously not limited to devices of the type shown in FIGURES 1 and 2, although it is particularly suitable for use with movable devices of such construction. It may be utilized in any photometric devices regardless of use. Further, although the embodiments of the invention herein shown constitute desirable and convenient constructions, persons skilled in the art will readily devise other devices utilizing the teachings of the invention. Accordingly, the invention should be considered as extending in scope to all structures described in the appended claims, and equivalents thereof.

What is claimed is:
1. In a photometric device having a plurality of light beams, a light-sensitive transducer, means for focusing both beams on the transducer, a shutter movable in the beams between positions alternately blocking and exposing the respective beams, means for moving the shutter cyclically between said positions to modulate both beams to produce a cyclic voltage output signal from the transducer having portions of the cycle thereof responsive in amplitude to the respective light beams, an auxiliary source of voltage synchronous with the signal voltage, and means for multiplicatively mixing the signal and auxiliary voltages to detect differences in amplitudes of portions of the signal cycle, the improved construction having means responsive to the modulation of light by the shutter to fix the phase of the auxiliary voltage with respect to the cycle of motion of the shutter.

2. The photometric device of claim 1 wherein the phase-fixing means comprises an auxiliary source of light and an auxiliary light-sensitive transducer, the shutter being interposed in the light path between the auxiliary source and the auxiliary transducer.

3. The photometric device of claim 2 having a rotating shaft, the shutter comprising a rotating opaque member on the shaft, and having means for mounting the auxiliary source and transducer on opposite sides of the shutter, the mounting means including means for moving the source and transducer on a path coaxial with the shaft for adjustment of the phase thus fixed.

4. The photometric device of claim 1 wherein the phase-fixing means comprises means for deflecting a portion of at least one of said beams as modulated by the shutter to produce an auxiliary modulated beam, and an auxiliary transducer in the path of the auxiliary beam.

5. The photometric device of claim 1 wherein the phase-fixing means comprises phasing means responsive to the signal output of the transducer and coupled to the auxiliary source of voltage for control thereof.

6. In a photometric device for comparison of light beams, a light-sensitive transducer, a mechanical shutter alternately exposing the transducer to the beams under comparison to produce a signal voltage having portions of amplitudes corresponding to beam intensities, an alternating voltage source responsive to the interruption of light by the shutter to produce a reference voltage having portions of equal amplitude, and means for mixing each portion of the reference voltage with the corresponding portion of the signal voltage, the phase of the reference voltage thus being fixed with respect to the phase of the signal voltage.

7. In a photometric device for comparison of light beams, a light-sensitive transducer, a mechanical shutter alternately exposing the transducer to the beams under comparison to produce a signal voltage having portions of amplitudes corresponding to beam intensities, a reference-voltage-operable detector coupled to the transducer, the light path between the shutter and the transducer and the coupling between the transducer and the detector constituting an electro-optical path for the modulated beams and the correspondingly modulated transducer output, a source of reference voltage coupled to the detector for the operation thereof, and a branch from the electro-optical path coupled to the source of reference voltage to maintain the reference voltage in fixed phase relation to the signal input to the detector.

8. The device of claim 7 wherein the branch from the electro-optical circuit comprises an electrical connection in the portion of the electro-optical path between the transducer and the detector.

9. The device of claim 8 wherein the branch from the electro-optical circuit comprises means for diverting a portion of the modulated light from the path between the shutter and the transducer and a second transducer producing an electrical signal fixing the phase of the reference voltage.

References Cited in the file of this patent

UNITED STATES PATENTS

| | | |
|---|---|---|
| 1,680,756 | Winter | Aug. 14, 1928 |
| 1,931,852 | Reichel et al. | Oct. 24, 1933 |
| 2,442,910 | Thomson | June 8, 1948 |
| 2,956,472 | Hildebrand | Oct. 18, 1960 |
| 2,968,736 | Dobberstein | Jan. 17, 1961 |

FOREIGN PATENTS

| | | |
|---|---|---|
| 666,786 | Great Britain | Feb. 20, 1952 |

OTHER REFERENCES

Whitford et al.: "Photoelectric Guiding of Astronomical Telescopes," R.S.I., March 1937, pages 78–82.